(12) United States Patent
Kurz et al.

(10) Patent No.: US 12,248,208 B2
(45) Date of Patent: Mar. 11, 2025

(54) INTEGRATED CIRCUIT, SYSTEM, AND METHOD FOR COUPLING OPTICAL SIGNALS INTO AN INTEGRATED CIRCUIT

(71) Applicant: Volkswagen Aktiengesellschaft, Wolfsburg (DE)

(72) Inventors: Heiko Gustav Kurz, Hannover (DE); Thomas Gisder, Wolfsburg (DE); Marc-Michael Meinecke, Sassenburg (DE); Heiko Schröder, Meinersen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 18/753,834

(22) Filed: Jun. 25, 2024

(65) Prior Publication Data

US 2025/0013087 A1    Jan. 9, 2025

(30) Foreign Application Priority Data

Jul. 7, 2023   (DE) .......................... 102023206495.2

(51) Int. Cl.
*G02F 1/13*      (2006.01)
(52) U.S. Cl.
CPC ................. *G02F 1/1326* (2013.01)
(58) Field of Classification Search
CPC .... G02F 1/1326; G02F 2201/58; G02F 1/035; G02F 1/0151; G02F 1/133; G02B 6/3536; G02B 6/3596; G02B 6/30
See application file for complete search history.

(56) References Cited

U.S. PATENT DOCUMENTS

| | | |
|---|---|---|
| 6,999,649 B1 | 2/2006 | Chen |
| 2003/0219197 A1 | 11/2003 | Kawamoto |
| 2016/0202420 A1 | 7/2016 | Paquet |
| 2018/0015661 A1 | 1/2018 | Xu et al. |

FOREIGN PATENT DOCUMENTS

WO   2013115995 A1   8/2013

OTHER PUBLICATIONS

Priority German Application No. 102023206495.2. Search Report (Feb. 27, 2024).

*Primary Examiner* — Donald L Raleigh
(74) *Attorney, Agent, or Firm* — Peter Zura; LOZA & LOZA, LLP

(57) ABSTRACT

An integrated circuit including an optical input, which can be coupled to an optical fiber, allowing an optical signal to be provided to the optical input via the optical fiber. The integrated circuit includes a controllable liquid crystal element, into which the optical signal can be coupled via the optical input. The integrated circuit is characterized by an optical waveguide arranged directly at the liquid crystal element, and a control device designed to activate the liquid crystal element to modulate its refractive index, thereby enabling at least partial coupling of the optical signal into the optical waveguide. The present disclosure also relates to a system and a method.

20 Claims, 8 Drawing Sheets

INTEGRATED CIRCUIT, SYSTEM, AND METHOD FOR COUPLING OPTICAL SIGNALS INTO AN INTEGRATED CIRCUIT

RELATED APPLICATIONS

The present application claims priority to German Patent App. No. 10 2023 206 495.2, filed on Jul. 7, 2023, the contents of which are incorporated by reference in its entirety herein.

TECHNICAL FIELD

The present disclosure relates to an integrated circuit having an optical input which can be coupled to an optical fiber, wherein an optical signal can be provided to the optical input by way of the optical fiber. The integrated circuit furthermore comprises a controllable liquid crystal element, into which the optical signal can be coupled via the optical input.

The present disclosure furthermore relates to a system comprising an integrated circuit and at least one optical fiber.

The present disclosure furthermore relates to a method for coupling optical signals into an integrated circuit, wherein an optical fiber is coupled to an optical input of the integrated circuit, and wherein an optical signal is provided by way of the optical fiber. The optical signal is coupled into a controllable liquid crystal element of the integrated circuit.

BACKGROUND

For example, WO 2013/115995 A1 discloses a device and a system to perform optical alignment, using one or more liquid crystal layers to actively steer a light beam from an optical fiber to an optical waveguide integrated on a chip. An on-chip feedback mechanism can steer the beam between the fibers and a grating-based waveguide to minimize the insertion loss of the system.

US 2016/0 202 420 A1 discloses an active optical coupling system. The system comprises a photonic chip having a photonic integrated circuit disposed thereon, wherein a photonic integrated circuit waveguide element comprises an intermediate coupling element, which is disposed on the waveguide element. A refraction of the liquid crystal element is provided, which is optically coupled via the intermediate coupling element to the waveguide element, wherein the liquid crystal element has a first face for receiving light and a second face, opposite the first face, for outputting the received light.

Furthermore, US 2015/0 156 661 A1 discloses an optical circuit, which has a fiber array made of solid-state waveguides which carries out the beam steering of an optical signal. The optical beam has a modulator for modulating a bit sequence on the carrier sequence of the optical signal. The beam-steered signal includes the modulated bit sequence. The optical circuit can comprise a photodetector.

SUMMARY

Aspects of the present invention relate to improving the coupling of an optical signal into an integrated circuit by increasing the incoupling tolerance.

Aspects of the present disclosure are described in the features recited in the independent claims, found below. Further aspects are described in the features recited in the dependent claims.

In some examples, an integrated circuit is disclosed, comprising: an optical input that can be coupled to an optical fiber, allowing an optical signal to be provided via the optical fiber; a controllable liquid crystal element that receives the optical signal through the optical input; an optical waveguide positioned directly at the liquid crystal element; and a control device designed to activate the liquid crystal element to modulate its refractive index, thereby enabling at least partial coupling of the optical signal into the optical waveguide.

In some examples, a method is disclosed for coupling optical signals into an integrated circuit. This method includes coupling an optical fiber to an optical input of the integrated circuit, allowing an optical signal to be provided via the optical fiber. The optical signal is then coupled into a controllable liquid crystal element of the integrated circuit. The method further involves activating the liquid crystal element through a control device within the integrated circuit, which modulates the refractive index of the liquid crystal element. As a result, the optical signal is coupled from the liquid crystal element into an optical waveguide within the integrated circuit based on the modulated refractive index.

This method can be used to couple an optical signal into an integrated circuit according to any of the technologies or techniques described herein. The optical fiber can be coupled to the optical input, or positioned at the optical input, either manually or automatically. Based on the modulated refractive index of the liquid crystal element, achieved through its activation, the optical signal can be coupled to the optical waveguide of the integrated circuit regardless of the positioning or quality of the coupling.

The integrated circuit or system described herein can include technical components for performing the described method. In some examples, the optical signal is coupled into the liquid crystal element, allowing it to propagate within the material of the liquid crystal element. Depending on the degree of control applied to the liquid crystal element, the refractive index can be modulated, enabling the propagated optical signal to be coupled into the optical waveguide.

In other examples, a voltage is applied to or varied at multiple electrodes of the liquid crystal element during activation, changing the orientation of the molecules in the liquid crystal element and modulating the refractive index. This voltage-dependent modulation allows the optical signal propagated within the liquid crystal element to be coupled into the optical waveguide.

Advantageous configurations of one aspect of the present disclosure should be considered advantageous configurations of all other aspects, and vice versa. For scenarios not explicitly described, the method may provide an error message, a request for user feedback, a standard setting, or a predetermined initial state.

The present disclosure also includes enhancements of the system and method, incorporating features previously described in connection with the enhancements of the integrated circuit. Therefore, these enhancements are not described again here.

Additionally, the present disclosure encompasses combinations of the features described in the various embodiments.

BRIEF DESCRIPTION OF THE DRAWINGS

Exemplary embodiments of the invention are described hereafter. In the drawings.

DETAILED DESCRIPTION

Figure 1:
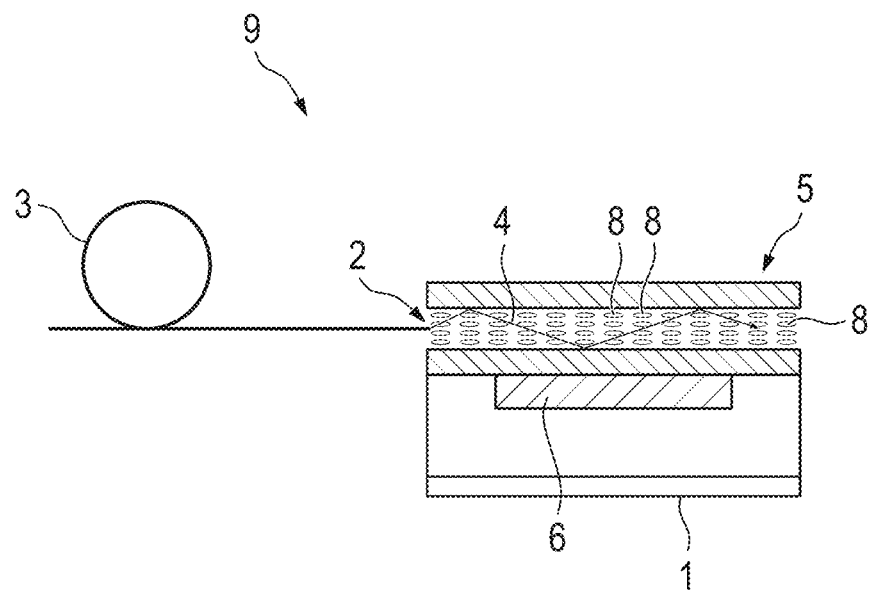
FIG. 1 illustrates a schematic sectional view of an integrated circuit, comprising a liquid crystal element that can be activated, according to some aspects of the present disclosure.

The exemplary embodiments described hereafter are preferred exemplary embodiments of the invention. In the exemplary embodiments, the described components in each case represent individual features of the invention which are to be considered independently of one another and which each also refine the invention independently of one another and, as a result, shall also be considered to be an integral part of the invention, either individually or in a combination other than the one shown. Furthermore, the described exemplary embodiments can also be supplemented with additional of the above-described features of the invention.

In the figures, functionally equivalent elements are each denoted by the same reference numerals.

As a result of the integrated circuit according to the present disclosure, coupling of an optical signal or a light beam into the integrated circuit can be improved since efficient incoupling can take place through the controllable liquid crystal element, regardless of the position between the optical fiber and the optical waveguide. The incoupling tolerance or tolerance regarding the incoupling can be increased with the aid of the controllable liquid crystal element. This can facilitate the incoupling process, reducing both time and costs associated with the incoupling of the optical signal.

The integrated circuit can be an electronic and photonic cointegrated circuit. For this purpose, the principle of electronic and photonic cointegration in a chip can be used. Silicon on insulator regions can be used for the photonic components and bulk silicon regions for the electronic circuits in one technology. This has advantages in implementing high signal quality at low parasitic perturbations at high data rates. The connection of high-frequency circuits, such as those used for radar antennas including frequency multipliers, to an optical transceiver can be implemented without additional wiring or flip-chip bonding. The optical circuits used in this process are integrated into semiconductors, enabling a plurality of optical signal transmissions and logic circuits to be employed in data centers, telecommunications, radar technology, and analog optical computing (AOC). These can be fields of application of the integrated circuit described herein.

The circuit described herein can have advantages over fiber-to-chip coupling. In such fiber-to-chip coupling, the distance between the fiber and the incoupling point on the chip must be very small for signal transmission from the fiber into the chip so that the fiber output can be mapped on the incoupling structure. Additionally, three solid angles-roll, yaw, and pitch angles—must be precisely adjusted to the incoupling structure, requiring complex technologies. These issues can be addressed by the integrated circuit described herein and the controllable liquid crystal element.

Another prior art option for coupling is edge coupling, where the fiber end with the fiber core is positioned a small distance from a waveguide on a semiconductor, allowing the electromagnetic beam to be mapped onto the waveguide after emission from the fiber end and coupled into the semiconductor. Another coupling option is grating coupling, which performs fiber-to-chip coupling using a grating coupler. The fiber is directed at the chip at an angle to the surface normal, and an optical grating structure couples the electromagnetic radiation into the semiconductor-integrated waveguide. A beam offset can be measured by a liquid crystal (LC) element, as can the resulting coupling loss. During measurement, an LC element can be integrated into a collimator, and the fiber beam can be coupled via edge coupling into an integrated photonic circuit. Discrete elements can be used in this process, but losses due to mispositioning and lateral beam offset from refractive index modulation in the LC element can arise.

The described methods of incoupling an optical signal have considerable problems when using conventional integrated circuits. The issues of coupling these technologies into conventional integrated circuits can be advantageously solved by the present disclosure. Unlike known methods, precise positioning between the fiber and the incoupling structure can be dispensed with by the integrated circuit described herein. The described methods require mode matching of the emitted radiation and the incoupling structure to transmit beams into the chip with minimal loss, necessitating modulation of the spatial intensity profile. This can be avoided with the integrated circuit described herein. Additionally, the described methods have higher cost expenditure compared to the present disclosure since they require discrete imaging optics. The present disclosure offers advantages in that it increases the tolerance for angle acceptance for loss-minimized incoupling between the fiber and the chip. This contrasts with the prior art, which typically allows only an angle acceptance between 7 and 9 degrees. Another problem is the high degree of quality required for positioning the fiber relative to the chip, making the adjustment time for fiber-to-chip couplings 60 seconds per application in an automated process, which is a constraint for mass production. This can also be advantageously solved by the present disclosure. The integrated circuit described herein enables an automated connection of optical fibers to photonic or electronic and photonic semiconductors with high incoupling tolerance and increases the incoupling speed for serial production.

Previously, coupling optical signals from optical waveguides into photonic structures on semiconductors, especially with single-mode fibers, was extremely sensitive to translation in x, y, z, and rotation (pitch, yaw, gear), as well as polarization, due to the small fiber core diameter. These problems can be solved by the integrated circuit described herein. Another problem with existing incoupling methods was setting the required high-precision positioning about all six degrees of freedom, optimized through iterative processes. These processes are time-consuming, requiring high investment in machines and extended production times. The integrated circuit described herein employs liquid crystal (LC) methods or liquid crystal on silicon (LCOS) structures for generating a spatially and rotatorily tolerant incoupling structure, allowing the fiber to be placed essentially arbitrarily on the chip or electric circuit. This makes the incoupling process more efficient, cost-effective, and simpler.

The present disclosure offers advantages by achieving a higher degree of miniaturization at the chip level and reducing chip surface area compared to conventional electronics or EPIC technology. Furthermore, modulation of the amplitude, polarization, fibers, and wavelengths of the incoupled beam can be carried out. The integrated circuit can be integrated on semiconductor chips in CMOS-SIN-SMOS-WI-CMOS-hybrid-BiCMOS, LIND, and INP processors on photonic and electronic co-integrated chips. It can also be employed in multi-chip solutions or flip-chip solutions. Instead of the liquid crystal elements, a liquid crystal element on a silicon substrate (LCOS) can be used.

With the integrated circuit, the incoupling tolerance in the alignment "fiber-to-chip" in translation (x, y, z) and rotation (pitch, yaw, gear) can be increased. An improvement of the automated fiber-to-chip application from 60 seconds to the single-digit second range, such as 5 seconds, can be achieved. Additionally, environmental factors such as temperature can be corrected for, ensuring optimal incoupling performance through active feedback loops in the LC element. The integrated circuit described herein provides cost advantages by simplifying the incoupling process significantly. The liquid crystal element, also referred to as LC element, can be integrated into a photonic integrated semiconductor circuit (PC). The optical fiber can be coupled or connected to the liquid crystal element, allowing imprecise coupling or positioning. Radiation or the optical signal from the fiber can be coupled into the liquid crystal element and propagate therein. The optical waveguide can be located beneath the liquid crystal element. Alternatively, a coupling structure for optical coupling can be used. Using the control device, the refractive index of the liquid crystal element can be changed or adapted so that the radiation or optical signal can be coupled into the optical waveguide or waveguides integrated into the integrated circuit. The controllable liquid crystal element can act similarly to a lens element, allowing the beam to be coupled accordingly. The integrated circuit described herein can be employed in vehicles, particularly motor vehicles, and used in driver assistance systems, parking assistance systems, radar-based surroundings detection, or systems for automatic or autonomous driving.

Further fields of application for the integrated circuit include use in quantum computers, shipping containers, warehouse robots, logistics systems, "big data," cloud services, mobile phones, or server devices. For example, the integrated circuit can have multiple optical inputs, multiple controllable liquid crystal elements, multiple optical waveguides, and at least one control device.

The control device can be an electronic control unit, such as a control module or a microcontroller. Using the control device, it is possible to modulate or change the refractive index of the liquid crystal element by activating it, allowing the optical signal to be coupled into the optical waveguide depending on the type or positioning of the optical fiber. In this way, the liquid crystal element can act as an intermediate piece or element between the optical input and the waveguide.

In some examples, the liquid crystal element comprises multiple electrodes, which are arranged in and/or at the liquid crystal element. The liquid crystal element is activated by applying or varying a voltage at the electrodes, allowing the refractive index to be modulated based on the voltage. Depending on the application and configuration of the integrated circuit, the number of electrodes in the liquid crystal element can be predefined or defined. The electrodes can be arranged within or outside the liquid crystal element. For example, the electrodes can be coupled or hard-wired to the control device, enabling the voltage to be varied or set by the control device. The voltage at the electrodes can also be switched off or reapplied. Depending on the incoupling to be carried out and the positioning of the fiber relative to the integrated circuit, a voltage level can be set or predefined. The refractive index is modulated based on the voltage, establishing a relationship between the applied voltage and the refractive index. This allows various incouplings to be performed by applying the necessary voltage to the electrodes. Additionally, an activatable matrix can be predefined for the multiple electrodes, controlled by the control device.

For example, voltage and refractive index relationships can be indicated in a look-up table.

By changing the voltage and thereby modulating the refractive index, precise positioning between the fiber and the integrated circuit or the optical input can be dispensed with. For instance, the optical signal can be provided by the optical fiber and transmitted to the optical input. One end of the optical fiber can be at least partially, and preferably completely, placed against the liquid crystal element and optionally be adhesively bonded. The optical signal exits the fiber and propagates within the liquid crystal element. Using the control unit and the electrodes, the orientation of molecules in the liquid crystal element can be changed electronically, allowing the electromagnetic radiation or optical signal to couple into a coupling structure beneath the liquid crystal element, such as an optical waveguide or a grating coupler. The electromagnetic radiation or optical signal then propagates through the coupling structure and into the optical waveguide of the integrated circuit.

By applying or varying the voltage at the electrodes, index matching can be performed within the liquid crystal element, enabling the optical signal to couple from the liquid crystal element into the optical waveguide beneath it.

In some examples, a feedback loop is provided to control the voltage at the electrodes based on the optical signal coupled into the optical waveguide. This enables continuous improvement of the incoupling through corresponding control. The control device can be used for this purpose. Using the feedback loop, the offset of the beam or optical signal can be adjusted in all three axes (x, y, z) and three solid angles (roll, pitch, yaw) to optimize the coupling into the integrated circuit. The feedback loop or electro-optical feedback loop of the integrated circuit can control the electrodes for refractive index modulation. With the feedback loop, optimal coupling adjustments of the optical signal in x, y, z directions, as well as roll, pitch, and yaw angles, can be made even if the fiber-to-chip connection is imprecise. Along with the optical connection between the fiber and the liquid crystal element, an electrical connection can be used. The liquid crystal element can be bonded to the integrated circuit and designed as a liquid crystal on silicon (LCOS). The integrated circuit can be an EPIC chip with integrated LCOS.

It is also possible for the optical waveguide to be arranged in various positions or sides of the liquid crystal elements. For example, incoupling can be performed on the upper substrate, using total internal reflection (TIR) interfaces like glass-air and glass-liquid crystal. By changing the liquid crystal orientation, the refractive index delta of the glass-liquid crystal can be controlled to enable coupling into a grating, leveraging the scattering properties of the liquid crystal element.

In some examples, the integrated circuit comprises an optical distributor that provides the optical signal coupled into the optical waveguide to the feedback loop and a functional unit of the integrated circuit. The functional unit can provide control, monitoring, or output functions based on the information from the incoupled optical signal. The optical distributor allows information to be sent to the control device regarding the quality of the incoupled optical signal, enabling continuous improvement of the incoupling by adjusting the voltages at the electrodes.

Additionally or alternatively, the integrated circuit comprises a photodiode that converts the optical signal into an electrical signal before providing it to the feedback loop. The feedback loop involves electronic feedback, requiring optical-to-electrical conversion of the optical signal. The control device also requires an electrical signal to control the electrodes and the liquid crystal element through open or closed loop control.

The photodiode can be a phototransistor or an optical-to-electronic converter unit.

In some examples, the electrodes of the liquid crystal element are arranged in a predefined structure in and/or at the liquid crystal element. Depending on the application and possible incoupling processes, the electrode structure can be defined accordingly. The electrode structure is configured to achieve the desired refractive index modulation based on the voltage at the electrodes. Various electrode structures are possible, including matrix activation of individual electrodes.

Additionally or alternatively, electrodes can be uniformly distributed in or at the liquid crystal element. Uniform distribution on opposing sides allows for the corresponding refractive index modulation based on the specific case or situation.

In some examples, a coupling unit is arranged between the optical input and the liquid crystal element. The coupling unit is designed to couple the optical signal from the optical fiber into the liquid crystal element, regardless of the optical fiber's positioning relative to the integrated circuit. This allows for easy, cost-effective, and uncomplicated positioning of the optical fiber and ensures the optical signal is coupled into the liquid crystal element.

Another aspect of the present disclosure relates to a system comprising an integrated circuit as described herein and at least one optical fiber, wherein the optical fiber is coupled to the optical input of the integrated circuit to transmit an optical signal from the optical fiber to the integrated circuit. The system can be implemented in various fields of application for the integrated circuit. Multiple optical fibers can be coupled to the integrated circuit, with one optical input per optical fiber.

With the aid of an automation device, the optical fiber can be positioned at the optical input and subsequently coupled.

FIG. 1 illustrates a schematic representation, particularly a lateral sectional illustration, of an integrated circuit 1 or a semiconductor, according to some aspects of the present disclosure. The integrated circuit 1 can have an optical input 2 for providing optical signals or optical beams. For example, an optical fiber 3 can be positioned or coupled at the optical input. Using the optical fiber 3, an optical signal 4 can be provided to the input 2 of the integrated circuit 1. The optical signal 4 can be coupled into a controllable liquid crystal element 5.

The liquid crystal element 5 may be a liquid crystal element or a liquid crystal on silicon element. The optical signal 4 can be coupled into the liquid crystal element to propagate within the material of the liquid crystal element 5. The initial positioning of the fiber 3 relative to the optical input or the integrated circuit is not critical as the coupling initially occurs into the liquid crystal element 5. To make the optical signal 4 available within the integrated circuit 1 for additional functions and/or circuits, an optical waveguide 6 or coupling structure can be arranged directly beneath the liquid crystal element 5, as schematically shown in FIG. 1. This may be arranged in various positions or sides of the liquid crystal element 5. The optical waveguide 6 is used to steer or distribute optical signals within the integrated circuit 1. To couple the optical signal 4 from the fiber 3 into the optical waveguide 6, regardless of the fiber's positioning relative to the integrated circuit 1, the liquid crystal element 5 is controllable. For this purpose, the integrated circuit 1 can comprise a control device 7 (see FIG. 3), such as a microcontroller or other control unit.

Using the control device 7, the liquid crystal element 5 can be activated or controlled in such a way that the refractive index of the liquid crystal element can be modulated or changed. This refractive index modulation allows the optical signal 4 propagated within the liquid crystal element 5 to be deliberately coupled into the optical waveguide 6. The modulation of the refractive index involves changing the orientation of molecules 8 within the liquid crystal element 5.

For example, the integrated circuit 1 and the optical fiber 3 can be bundled into a system 9. The system 9 comprises the integrated circuit 1 and at least one optical fiber 3. Such a system 9 can be used in radar technology, telecommunications, automotive engineering, quantum computing, or other areas where integrated circuits and optical signals are applied.

Figure 2:
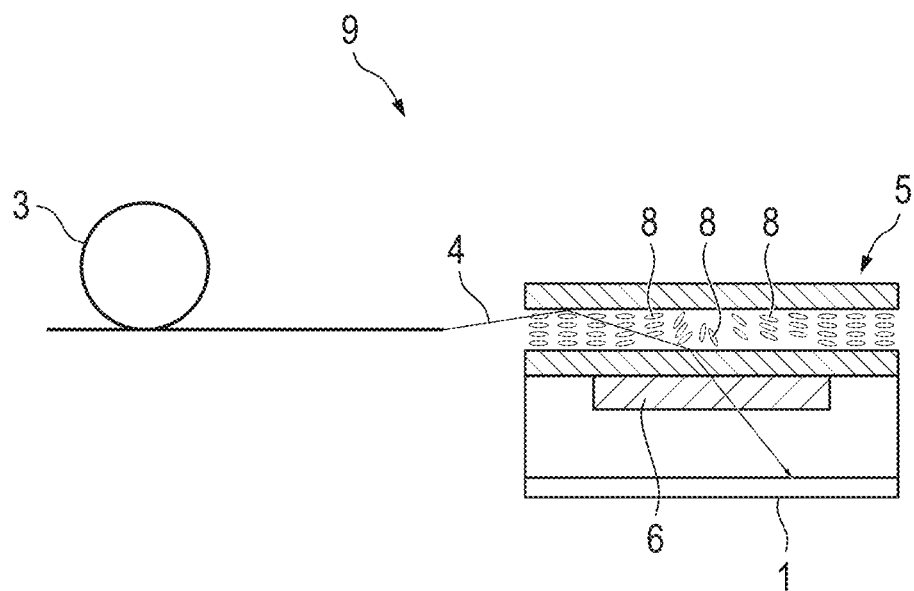
FIG. 2 illustrates a schematic representation of a coupling of an optical signal into the liquid crystal element which, in turn, can couple this optical signal into a waveguide thereeneath by modulation of the refractive index, according to some aspects of the present disclosure.

FIG. 2 illustrates that the liquid crystal element 5 is activated to change the orientation of some of the molecules 8, modulating the refractive index of the liquid crystal element 5. The optical signal 4 or beam that has propagated within the liquid crystal element 5 can be coupled into the optical waveguide beneath it, making the optical signal 4 available to the integrated circuit 1 without requiring complex, costly, and time-consuming incoupling processes.

This figure shows an exemplary fiber coupling of the fiber 3 using the liquid crystal element 5. By modulating the refractive index in the liquid crystal element 5 or LC element, index matching can be achieved, allowing the optical signal 4 to couple from the liquid crystal element 5 into the optical waveguide 6. The refractive index modulation can be performed by applying a voltage to the electrodes 10 (see FIG. 4) of the liquid crystal element 5.

Figure 3:
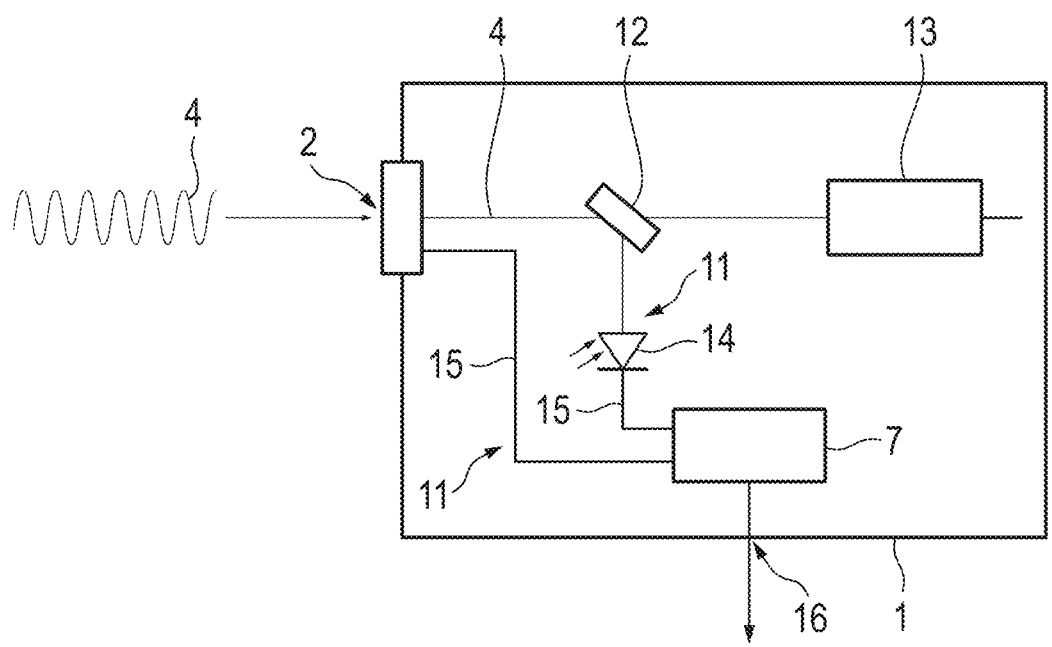
FIG. 3 illustrates the integrated circuit from the preceding figures with an additional electronic feedback loop for controlling the incoupling of the optical signal, according to some aspects of the present disclosure.

FIG. 3 illustrates the integrated circuit 1 with a feedback loop 11. To improve the coupling of the optical signal 4 into the waveguide 6, the optical signal 4 can be split after incoupling. An optical distributor 12, such as a beam splitter structure, can be provided for this purpose. Part of the optical signal 4 can be provided to a functional unit 13 of the integrated circuit 1. The functional unit 13 can involve chip functions related to the integrated circuit 1. Corresponding signals, such as a converted electrical signal, can be provided for further functions within the integrated circuit 1 or separate components. These signals can be relayed by electrical or optical connections. An optical photodiode 14 can be provided downstream from the distributor 12 for the feedback loop 11, converting the optical signal 4 into an electrical signal 15, which is then provided to the control device 7. Based on this electrical signal 15, the control device can modulate the refractive index. The electrodes 10 can be activated accordingly to vary or change the voltage at the liquid crystal element 5.

An electrical output 16 can be provided to transmit the electrical signal 15 to central evaluation units or processing units.

Using the feedback loop 11, automated adjustment of the optimal coupling of the optical signal 4 into the waveguide 6 can be achieved even with imprecise fiber-to-chip connections.

Figure 4:
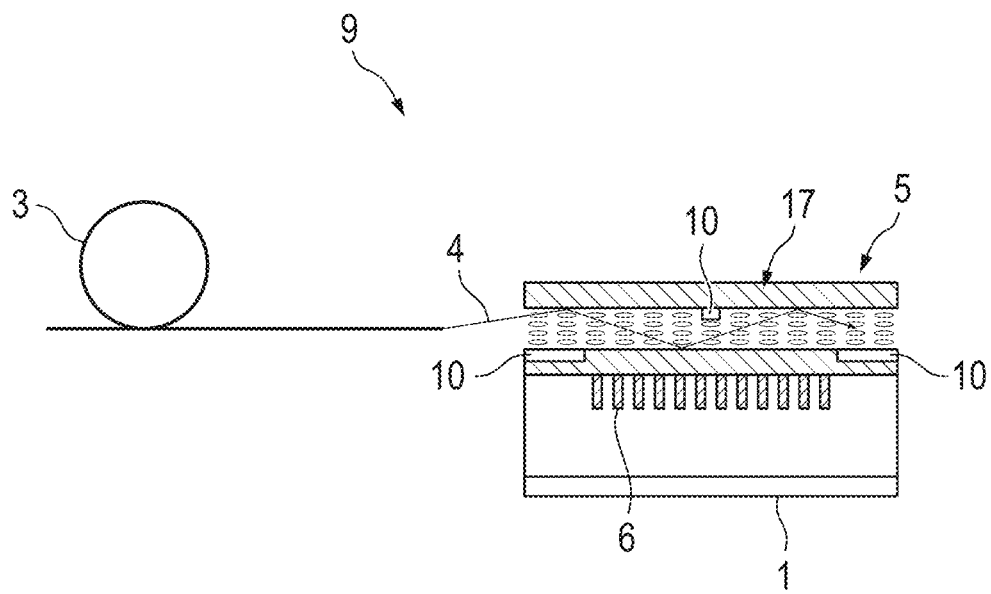
FIG. 4 illustrates a schematic side view of the integrated circuit from the preceding figures, wherein electrodes of the liquid crystal element are shown here, through which a voltage can be applied to achieve a refractive index modulation, according to some aspects of the present disclosure.

FIG. 4 illustrates another view of the integrated circuit 1 from the preceding figures, according to some aspects of the present disclosure. The electrodes 10 are shown here. A voltage can be applied or varied at these electrodes to perform refractive index modulation. In this example, the arrangement of the electrodes 10 is vertically distributed. The optical waveguide 6 is shown as a grating coupler here.

Figure 5:
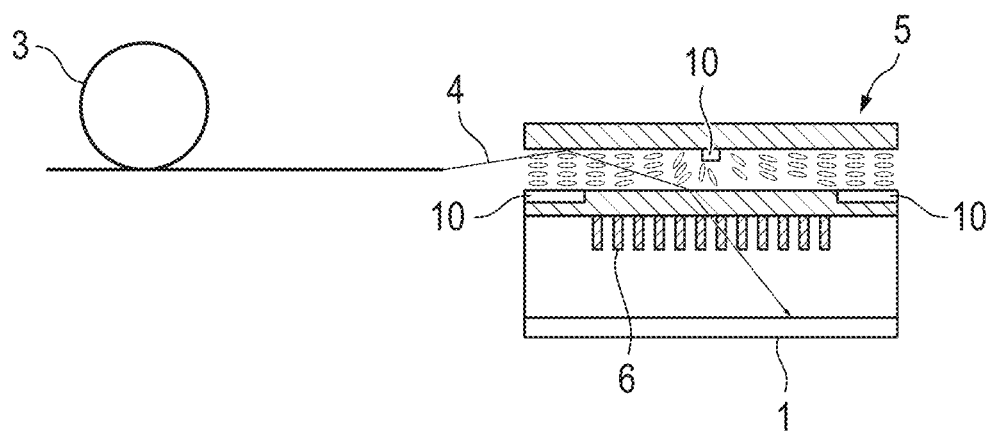
FIG. 5 illustrates, proceeding from FIG. 4, an exemplary embodiment in which a voltage is present at the electrodes, and the optical signal is coupled from the liquid crystal element into the waveguide, according to some aspects of the present disclosure.

In this illustration (FIG. 4), no voltage is currently applied, so the optical signal 4 propagates in the liquid crystal element 5 without refractive index modulation. FIG. 5, proceeding from FIG. 4, illustrates an example where a predefined voltage is applied at the electrodes 10, resulting in refractive index modulation and index matching. This allows the optical signal 4 to couple from the liquid crystal element 5 into the optical waveguide 6. The liquid crystal element 5 can be surrounded by a substrate 17 (see FIG. 4).

Figure 6:
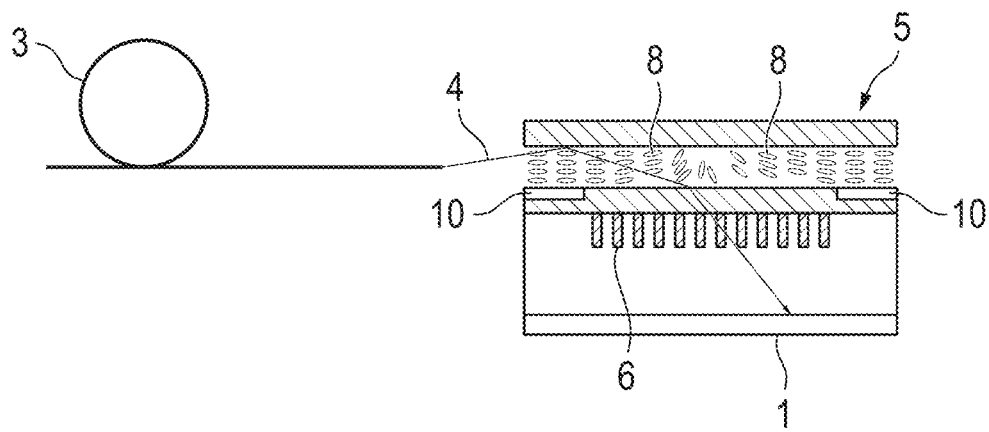
FIG. 6 illustrates another arrangement of the electrodes of the liquid crystal element, according to some aspects of the present disclosure.

FIG. 6 illustrates another example of fiber coupling related to the integrated circuit 1. The electrodes are arranged in a single plane on the side of the liquid crystal element 5 directed toward the waveguide 6. Refractive index modulation is performed by applying a voltage, changing the orientation of the molecules 8, and coupling the optical signal 4 into the waveguide 6.

Figure 7:
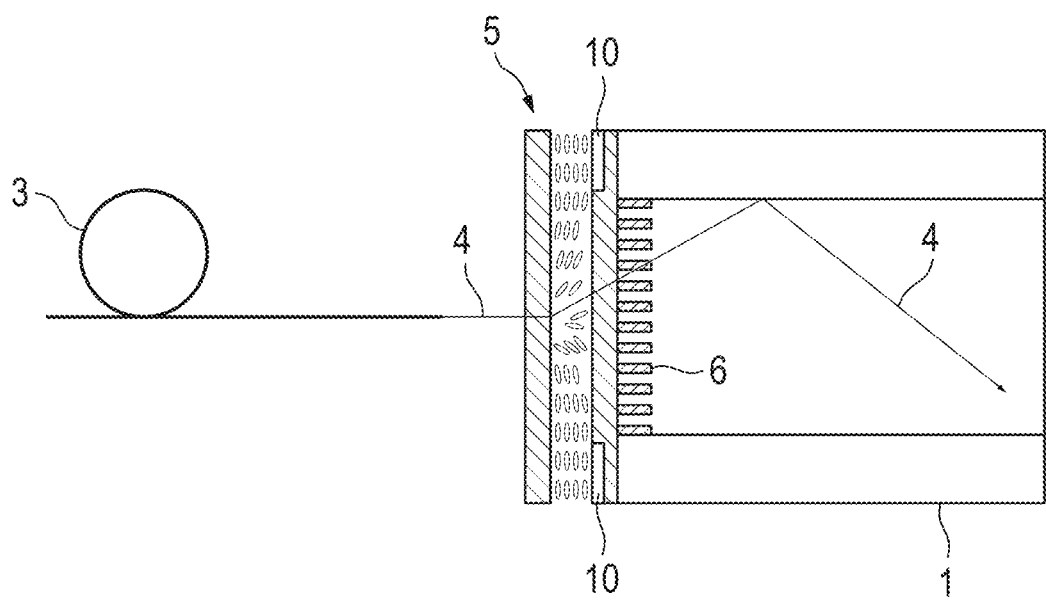
FIG. 7 illustrates another possible incoupling situation between the optical fiber and the integrated circuit, according to some aspects of the present disclosure.
Figure 8:
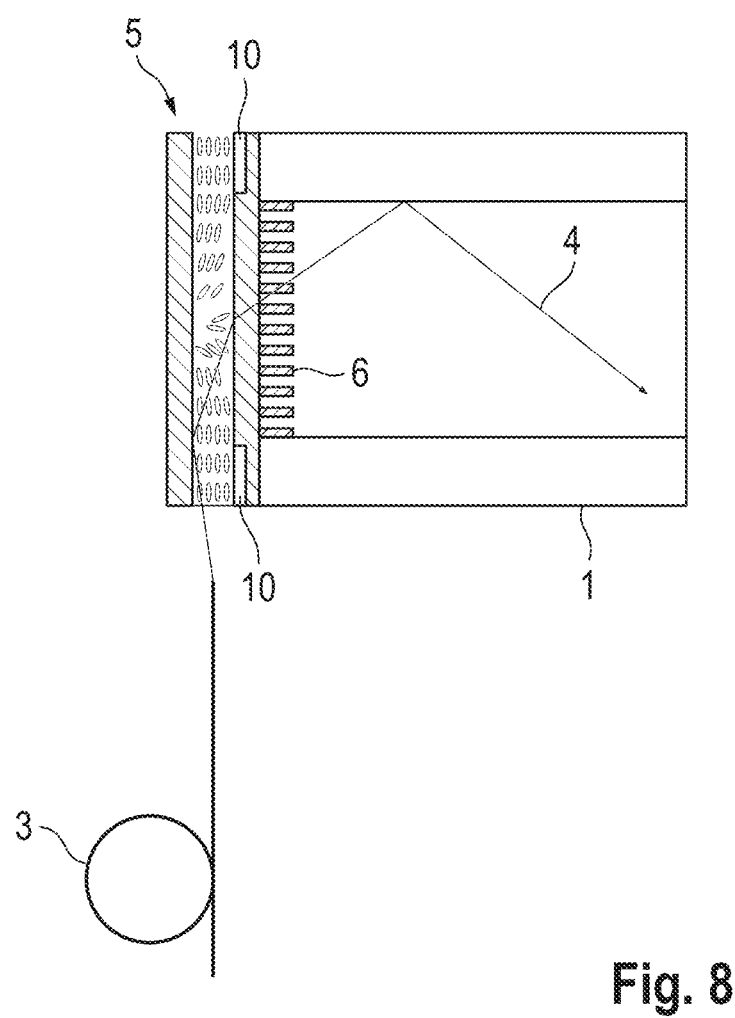
FIG. 8 illustrates another potential incoupling situation of the optical signal and of the optical fiber in the integrated circuit, according to some aspects of the present disclosure.

FIGS. 7 and 8, in turn, illustrate the integrated circuit 1 during fiber coupling, where a voltage is applied to couple the optical signal 4 into the waveguide 6. FIGS. 7 and 8 show a perpendicular incoupling of the optical signal 4 from the fiber 3 to the integrated circuit 1, meaning the fiber coupling occurs at an angle of 90 degrees to the chip surface of the integrated circuit 1.

As mentioned previously, the incoupling between the fiber and the integrated circuit 3 can be performed arbitrarily since the actual incoupling of the optical signal is managed by the controllable liquid crystal element 5.

FIGS. 9 to 13 show further embodiments of the integrated circuit 1, specifically related to fiber coupling. In these figures, an additional coupling unit 18 is provided, which can be arranged between the optical inputs or the fiber 3 and the liquid crystal element 5. The coupling unit 18 facilitates the coupling of the optical signal 4 from the optical fiber 3 into the liquid crystal element 5, regardless of the optical fiber's positioning relative to the integrated circuit 1. The coupling unit 18 can take various forms, as described in the following figures, to simplify or enhance the coupling of the optical signal 4 and the fiber 3 into the integrated circuit.

Figure 9:
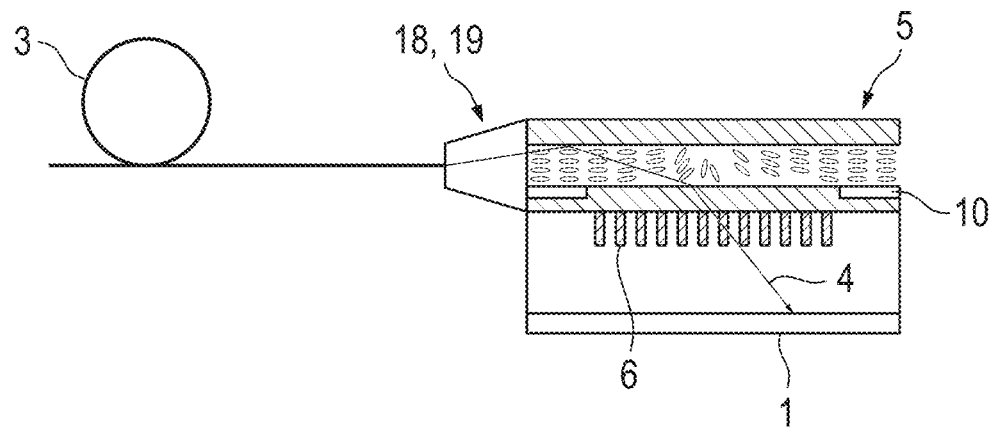
FIG. 9 illustrates another schematic lateral sectional illustration of the integrated circuit from the preceding figures, wherein a fiber taper is provided here for easier incoupling between the fiber and the integrated circuit, according to some aspects of the present disclosure.

In FIG. 9, the coupling unit 18 is shown as a fiber taper 19, which can be referred to as a taper, "GLOW," or connector. The fiber taper 19 has a tapering function to facilitate the incoupling of the optical signal 4.

Figure 10:
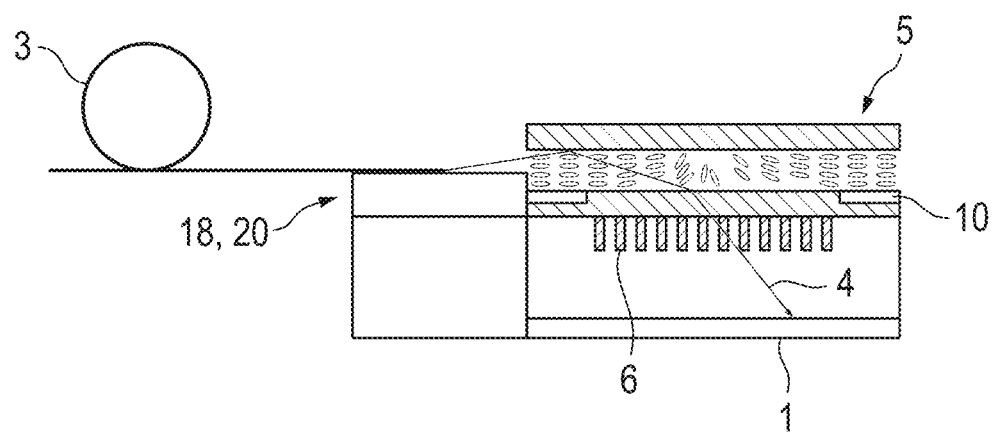
FIG. 10 illustrates in turn, proceeding from FIG. 9, an option for easier incoupling with an additional structure between the fiber and the integrated circuit, according to some aspects of the present disclosure.

In FIG. 10, the coupling unit 18 is designed as an additional structure 20, which can be arranged upstream from the optical input 2. This structure 20 can be a V-groove, a U-groove, a microstructure, or a nanostructure, used to facilitate the incoupling.

Figure 11:
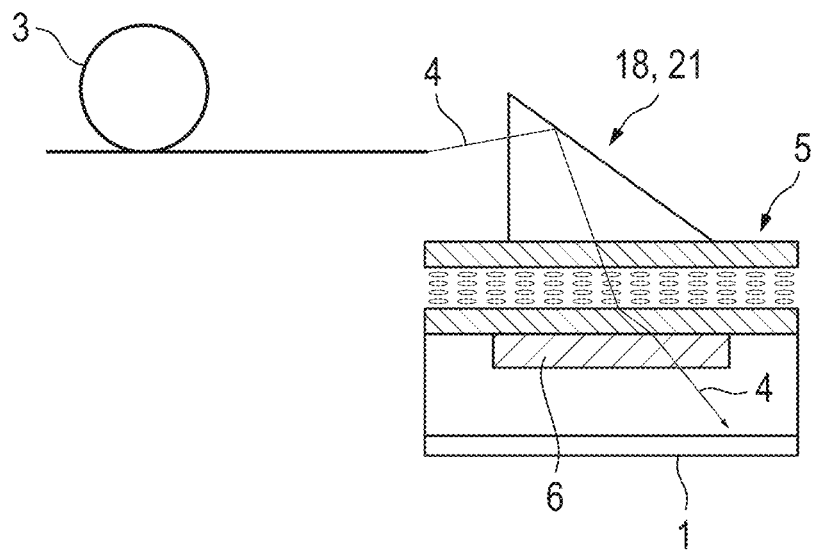
FIG. 11 illustrates another schematic lateral sectional illustration of the integrated circuit, wherein a prism coupler can be provided here for easier coupling of the optical signal into the integrated circuit, according to some aspects of the present disclosure.

FIG. 11 illustrates the coupling unit 18 configured as a prism coupler 21. The prism coupler 21 can be arranged on the side of the liquid crystal element 5 opposite the waveguide 6, positioned on the surface of the integrated circuit 1. The prism coupler 21, with its large surface or dimension, facilitates the incoupling of the optical signal 4 from the fiber 3.

Figure 12:
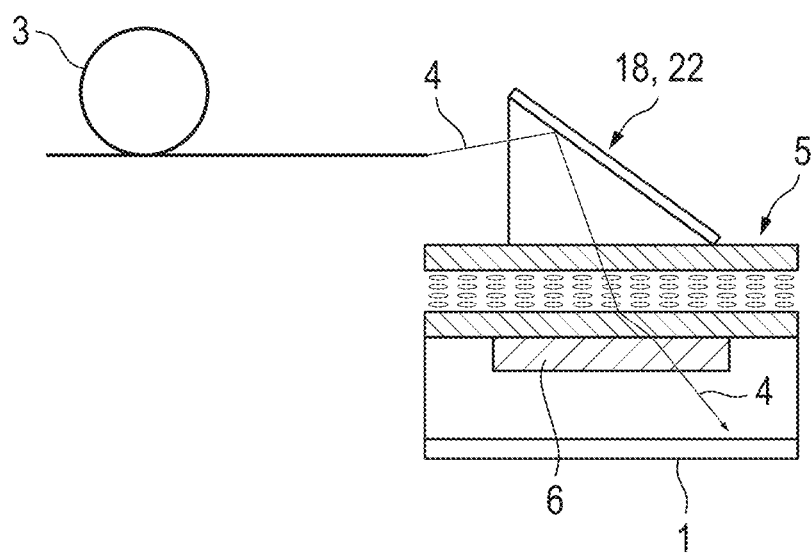
FIG. 12 illustrates, proceeding from FIG. 11, another configuration of the prism coupler, wherein the prism coupler here comprises an additional highly reflective layer, according to some aspects of the present disclosure.

FIG. 12 shows another embodiment of the coupling unit 18 as a prism coupler 22 with an additional highly reflective layer (HR coating). This configuration guides or directs the incoupled optical signal 4 to the liquid crystal element 5. Instead of the HR coating, the prism coupler 22 can have a grating structure.

Figure 13:
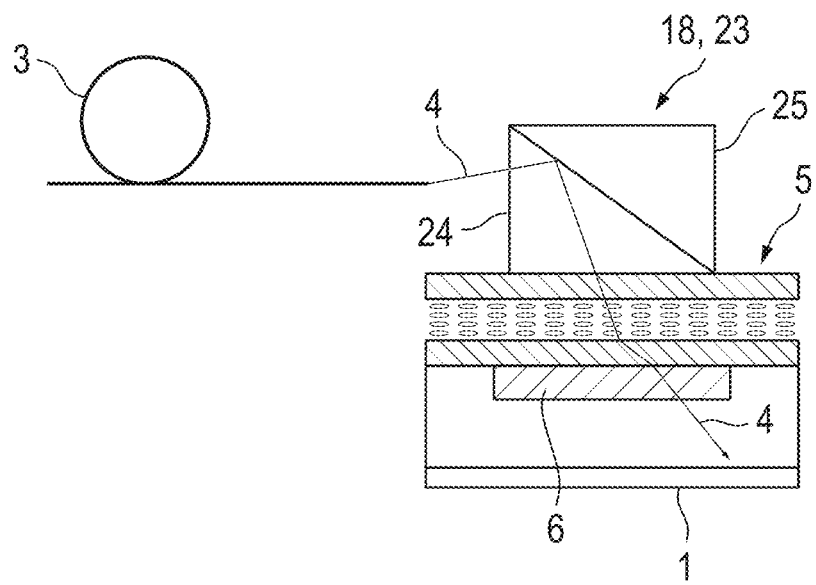
FIG. 13 illustrates another schematic sectional illustration of the integrated circuit, wherein a block coupler is provided here for easier coupling of the fiber into the integrated circuit, according to some aspects of the present disclosure.

In FIG. 13, the coupling unit 18 is shown as a block coupler 23, which facilitates the coupling of the optical signal 4 from the fiber 3 into the liquid crystal element 5. The block coupler 23 can have two different regions 24, 25 with different refractive indices, simplifying the incoupling of the optical signal 4 into the liquid crystal element 5.

For example, the fiber 3 can be a glass fiber.

Figure 14:
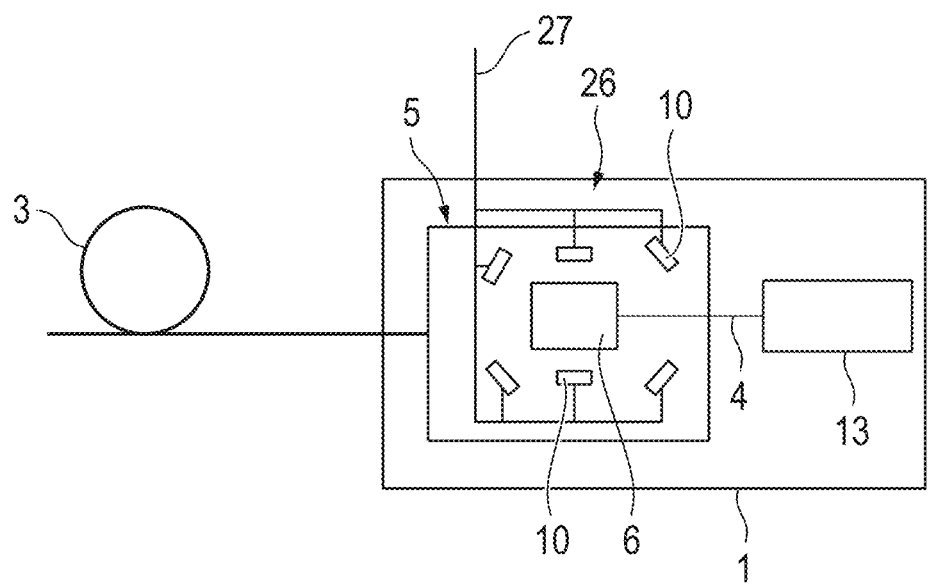
FIG. 14 illustrates another configuration of the integrated circuit, wherein the liquid crystal element here has a structured electrode arrangement to perform targeted refractive index modulation, according to some aspects of the present disclosure.

FIG. 14 illustrates another embodiment of the integrated circuit 1, specifically related to fiber coupling. Unlike the preceding figures, this figure shows a different arrangement between the liquid crystal element 5 and the waveguide 6, particularly a top view of the chip surface of the integrated circuit 1. The liquid crystal element 5 can be configured as a planar element, with the waveguide 6 or a coupling structure arranged above it, particularly centrally. The electrodes 10 can be arranged in an electrode structure 26 around the waveguide 6, forming a lens or prism structure. This enables arbitrary incoupling by modulating the refractive index of the liquid crystal element 5. The electrodes 10 can be controlled via a bus system, such as a communication bus 27, managed by the control device. FIG. 14 specifically illustrates a structured electrode arrangement 26 forming a lens or grating in the liquid crystal element 5, enabling adapted and arbitrary incoupling from the liquid crystal element 5 into the waveguide 6.

This embodiment in FIG. 14 offers the advantage of creating a continuously variable lens or prism in a stepless manner, thereby coupling the optical signal 4 into the waveguide 6.

The embodiments shown in the figures illustrate improved fiber-to-chip coupling.

LIST OF REFERENCE NUMERALS 1 integrated circuit
2 optical input
3 optical fiber
4 optical signal
5 liquid crystal element
6 optical waveguide
7 control device
8 molecules
9 system
10 electrode
11 feedback loop
12 optical distributor
13 functional unit
14 photodiode
15 electrical signal
16 output
17 structure
18 coupling unit
19 taper
20 additional structure
21 prism coupler
22 prism coupler including additional HR coating
23 block coupler
24, 25 regions of the block coupler
26 electrode structure
27 communication bus

The invention claimed is:

1. An integrated circuit, comprising:
an optical input configured to couple to an optical fiber, wherein the optical input is configured to receive an optical signal from the optical fiber;
a controllable liquid crystal element configured to receive the optical signal from the optical input;
an optical waveguide positioned directly at the liquid crystal element; and
a control device configured to activate the liquid crystal element to modulate its refractive index, thereby enabling the optical signal to be at least partially coupled into the optical waveguide.

2. The integrated circuit of claim 1, wherein the liquid crystal element comprises a plurality of electrodes arranged in and/or at the liquid crystal element.

3. The integrated circuit of claim 2, wherein the liquid crystal element is configured to be activated by applying or varying a voltage at the electrodes, thereby modulating the refractive index based on the voltage.

4. The integrated circuit of claim 3, further comprising a feedback loop configured to control the voltage present at the electrodes based on the optical signal that is coupled into the optical waveguide.

5. The integrated circuit of claim 4, further comprising an optical distributor configured to provide the optical signal coupled into the optical waveguide to the feedback loop and a functional unit of the integrated circuit, the integrated circuit further comprising a photodiode configured to convert the optical signal into a corresponding electrical signal before it is provided to the feedback loop.

6. The integrated circuit of claim 3, wherein the electrodes of the liquid crystal element are arranged in a predefined electrode structure in and/or at the liquid crystal element, with the electrodes being uniformly distributed.

7. The integrated circuit of claim 1, further comprising a coupling unit arranged between the optical input and the liquid crystal element, the coupling unit configured to couple the optical signal from the optical fiber into the liquid crystal element, regardless of the positioning of the optical fiber relative to the integrated circuit.

8. A system, comprising:
an integrated circuit, comprising:
an optical input configured to couple to an optical fiber, wherein the optical input is configured to receive an optical signal from the optical fiber;
a controllable liquid crystal element configured to receive the optical signal from the optical input;
an optical waveguide positioned directly at the liquid crystal element; and
a control device configured to activate the liquid crystal element to modulate its refractive index, thereby enabling the optical signal to be at least partially coupled into the optical waveguide.

9. The system of claim 8, wherein the liquid crystal element comprises a plurality of electrodes arranged in and/or at the liquid crystal element.

10. The system of claim 9, wherein the liquid crystal element is configured to be activated by applying or varying a voltage at the electrodes, thereby modulating the refractive index based on the voltage.

11. The system of claim 10, further comprising a feedback loop configured to control the voltage present at the electrodes based on the optical signal that is coupled into the optical waveguide.

12. The system of claim 11, further comprising an optical distributor configured to provide the optical signal coupled into the optical waveguide to the feedback loop and a functional unit of the integrated circuit, the integrated circuit further comprising a photodiode configured to convert the optical signal into a corresponding electrical signal before it is provided to the feedback loop.

13. The system of claim 10, wherein the electrodes of the liquid crystal element are arranged in a predefined electrode structure in and/or at the liquid crystal element, with the electrodes being uniformly distributed.

14. The system of claim 8, further comprising a coupling unit arranged between the optical input and the liquid crystal element, the coupling unit configured to couple the optical signal from the optical fiber into the liquid crystal element, regardless of the positioning of the optical fiber relative to the integrated circuit.

15. A method for operating an integrated circuit, comprising:
coupling an optical fiber to an optical input of the integrated circuit, wherein the optical input is configured to receive an optical signal from the optical fiber;
coupling the optical signal from the optical input to a controllable liquid crystal element of the integrated circuit; and modulating the refractive index of the liquid crystal element using a control device, thereby enabling the optical signal to be at least partially coupled into an optical waveguide positioned directly at the liquid crystal element.

16. The method of claim 15, further comprising arranging a plurality of electrodes in and/or at the liquid crystal element.

17. The method of claim 16, further comprising applying or varying a voltage at the electrodes to activate the liquid crystal element, thereby modulating the refractive index based on the voltage.

18. The method of claim 17, further comprising controlling the voltage present at the electrodes using a feedback loop based on the optical signal that is coupled into the optical waveguide.

19. The method of claim 18, further comprising:
providing the optical signal coupled into the optical waveguide to the feedback loop and a functional unit of the integrated circuit using an optical distributor;
converting the optical signal into a corresponding electrical signal using a photodiode before it is provided to the feedback loop.

20. The method of claim 17, further comprising arranging the electrodes of the liquid crystal element in a predefined electrode structure in and/or at the liquid crystal element, with the electrodes being uniformly distributed.

\* \* \* \* \*